United States Patent [19]

Schubert et al.

[11] Patent Number: 4,693,653

[45] Date of Patent: Sep. 15, 1987

[54] MOUNTING ELEMENT FOR A FLAT INSULATING BODY WHICH CAN BE ATTACHED TO A THIN-WALLED BASE

[75] Inventors: Rainer Schubert, Liebigstrasse 38; Otto Weber, Hubertusstrasse 144, both of D - 4620 Castrop-Rauxel, Fed. Rep. of Germany

[73] Assignees: Vereinigte Schraubenwerke GmbH, Essen; Rainer Schubert; Otto Weber, both of Castrop-Rauxel, all of Fed. Rep. of Germany

[21] Appl. No.: 834,273

[22] PCT Filed: May 9, 1985

[86] PCT No.: PCT/DE85/00153

§ 371 Date: Jan. 8, 1986

§ 102(e) Date: Jan. 8, 1986

[87] PCT Pub. No.: WO85/05165

PCT Pub. Date: Nov. 21, 1985

[30] Foreign Application Priority Data

May 9, 1984 [DE] Fed. Rep. of Germany ....... 3417108

[51] Int. Cl.⁴ .............................................. F16B 25/00
[52] U.S. Cl. .................................... 411/387; 411/402; 52/410; 81/176.2; 81/124.2
[58] Field of Search ............... 411/387, 400, 401, 378, 411/402, 485; 52/512, 410; 81/121.1, 124.2, 176.1, 176.15, 176.2

[56] References Cited

U.S. PATENT DOCUMENTS

| 817,090 | 4/1906 | Pfeiffer | 411/402 X |
| 2,403,359 | 7/1946 | Gerhold | 411/387 |
| 3,523,395 | 8/1970 | Rutter et al. | 411/401 X |
| 4,453,361 | 6/1984 | Hulsey | 411/378 X |
| 4,584,814 | 4/1986 | Hounsel et al. | 52/512 X |

FOREIGN PATENT DOCUMENTS

| 2611395 | 7/1977 | Fed. Rep. of Germany | 411/387 |
| 3106844 | 1/1982 | Fed. Rep. of Germany | |
| 2363671 | 3/1978 | France | |
| 7401162 | 1/1974 | Netherlands | 411/402 |
| 690269 | 4/1953 | United Kingdom | 411/387 |

OTHER PUBLICATIONS

German Publication 8017322, Meys, 12-1981.

*Primary Examiner*—Frederick R. Schmidt
*Assistant Examiner*—Debra S. Meislin
*Attorney, Agent, or Firm*—Sprung Horn Kramer & Woods

[57] ABSTRACT

The invention relates to a mounting element for a flat insulating body which is mounted on a thin-walled base, like the metal sheet of airduct. The element comprises a pin for perforating the insulating body and holding the body by a plate clamped on the pin and screw, the shaft of which is provided with a self-cutting thread and on the head of which, which as key engaging faces, the pin is sitting in alignment with the shaft.

4 Claims, 3 Drawing Figures

MOUNTING ELEMENT FOR A FLAT INSULATING BODY WHICH CAN BE ATTACHED TO A THIN-WALLED BASE

BACKGROUND OF THE INVENTION

1. Field of the Invention

The invention relates to a mounting element for a flat insulating body which can be mounted on a thin-walled base, particulary on the sheet metal of a duct of an air-conditioning system, particularly a heat-insulating mat or board, comprising a pin the one end of which is constructed for perforation of the insulating material and the other end of which is provided with a means for attachment to the base, and a clamping plate, which can be clamped to the pin, for holding the insulating body which can be pushed onto the pin.

A main field of application of such mounting elements is the attachment of insulations of ducts in an air-conditioning system. Such ducts are produced from thin-walled metal sheets, particularly galvanized steel sheets which can be easily bent. Because of the media carried in the ducts for the purpose of the air-conditioning, particularly conditioned air, it is necessary for the purpose of blocking heat and noise to line the ducts, which are frequently run in a complicated manner, with insulation. The insulation used is for example fibreglass mats which carry aluminium foil lining on one side. After such mats are attached to the ducts by means of the mounting elements, the aluminium foil lining is on the outside.

The insulation of such and similar thin-walled bases must be durable which makes special demands among others, on the firm seating of the insulating material on the base. As a rule, this can only be achieved by a double positive connection which on the one hand, holds the insulating material on the base, and on the other hand, joins the base to the insulating material. Such a closing shape requires multiple perforation of the thin-walled base and of the insulating material. Perforating the base already presents problems for reasons of its thin walls because, among other things, the buckling strength is relatively low and because, particularly in the case of the air-conditioning ducts, corrosion protection, for example galvanizing is present, the effects of which must not be impaired. The perforations of the insulating material can be generally easily effected as such because of its loose mass but they must make it possible that the insulation rests over its full area on the base in order to avoid areas which are not insulated. These conditions are best met by pointed thin steel pins which can penetrate the insulating material with corresponding ease and can be joined form closed to the material via clamping plates which are clamped to a roughened part-section of the pin behind the point of the pin.

2. Discussion of Prior Art

It is known to provide the pins with an adhesive head because of the abovementioned conditions set by the thin-walled base. In this case, the perforating of the thin-walled base and the associated damage to any galvanizing is eliminated, but with it the positive connection to the base. The non-positive connection which can be achieved by bonding is not always adequate. But bonding has the disadvantage, which it has hitherto not been possible to eliminate, that it is not durable enough to achive the life of air-conditioning systems with the available adhesives. Although this does not make such an ambodiment immediately unusable, it pre-supposes continuous monitoring and repair work which is costly and impractical.

In addition, it is known from DE-A 3,106,844 to attach insulating material to a roof cover base of metal by means of a threaded screw which, by means of its screw head, holds on the side of the insulating material facing away from the base a large-area washer which, in turn, holds the insulating material. The point of the screw shaft is constructed as a drill tip and the thread as a self-cutting thread. Attaching the insulating material to the roof cover base by means of such a screw is expensive because the screw must be screwed into the base if the insulating material rests against the base. This type of assembly of large-area insulating plates is possible only if either the insulating plates are resting on the roof and thus are self-supporting or are held by temporary holding means. In addition, it is necessary with this type of attachment of insulating material that the screws have a relatively large shaft cross-section and have the same cross-section even in the threadless shaft as in the area of the self-cutting thread so that the free length of the shaft can be passed through the insulating material. Without such passage and without a relatively large cross-section it is hardly possible, when applying force to the remote screw head, to set the screws accurately and to transfer the required torque without kinking or bending of the shaft to the drill tip and to the thread.

SUMMARY OF THE INVENTION

The invention is based on the objective of improving a mounting element of the type mentioned hereinbefore to such an extent that, while retaining the ease of assembly of the insulating body, the mounting elements can be simply and durably attached.

This objective is achieved by the mounting element of the said kind, wherein the means for attachment is a screw the shaft of which is provided with a self-cutting thread and a drill tip and on the head of which, which has key engaging faces, the pin is seated with its other end aligned with the shaft.

In the case of the mounting element according to the invention, the pin and the screw form one constructional unit which makes it possible to use a drilling device, for example a drilling machine. In this arrangement, the driving force is transferred via the key faces of the screw head which has a larger diameter than the bolt and the pin due to the construction of the collar. As a result, a favourable introduction of the forces needed for the drilling and thread cutting can be transferred via a relatively small axial length of the screw shaft. Since the shaft of the screw is provided with a drill tip, comparatively low pressing forces are sufficient even on smooth surfaces. This largely prevents the buckling otherwise occurring in the case of steel sheets. Drifting when starting the drilling is also avoided so that corrosion protection layers are not damaged. The self-cutting thread brings the further advantage of self-blocking of the shaft in the drilled hole and the advantage of sealing. However, the sealing can be further improved by a sealing dics arranged on the shaft of the screw and under its head. As in the case of the generic mounting elements, the assembly of the insulating bodies is very simple after attaching the mounting elements to the base because the insulating bodies only need to be pushed onto the relatively thin pins and fixed by pushing on clamping plates. This advantage becomes effective particularly in the case of complicated shapes as frequently occur in the case of ducts of air-conditioning systems. In accordance with a further development of the invention, the head of the screw can be conically tapered towards the pin. This development has the advantage that relatively long key faces can be constructed in the axial direction and that the insulating body comes to rest closely against the base due to the head penetrating into the insulating body. A preferred conical tapering consists in a four-sided truncated pyramid the surface areas of which form the key engaging faces.

For the drilling and screwing of the mounting element into the base, a key can be provided one end of which can be inserted into the drill chuck of a drilling machine and the free other end of which has inner counter faces which correspond to the outer key engaging faces and a recess, starting from the free end, for accommodating the pin when the key is placed on the head of the screw.

DESCRIPTION OF AN EMBODIMENT OF THE INVENTION

Brief Description of the Drawing of the Invention

DETAILED DESCRIPTION OF THE EMBODIMENT OF THE INVENTION

Figure 1:
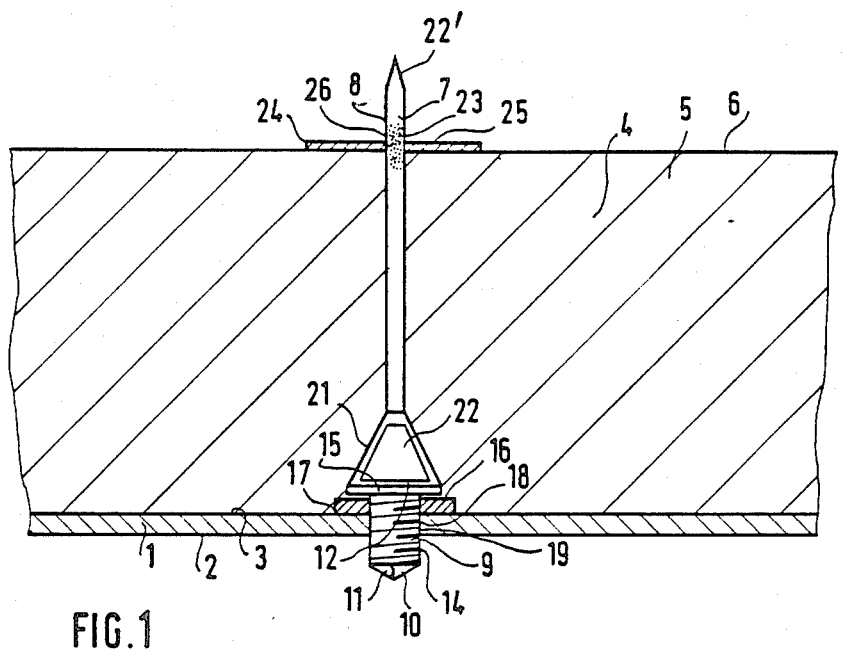
FIG. 1 shows a cross-section through a wall, which is lined with insulation, of a duct of an air-conditioning system.
Figure 2:
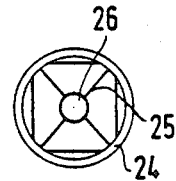
FIG. 2 shows an axial view of a mounting element from the pin side.
Figure 3:
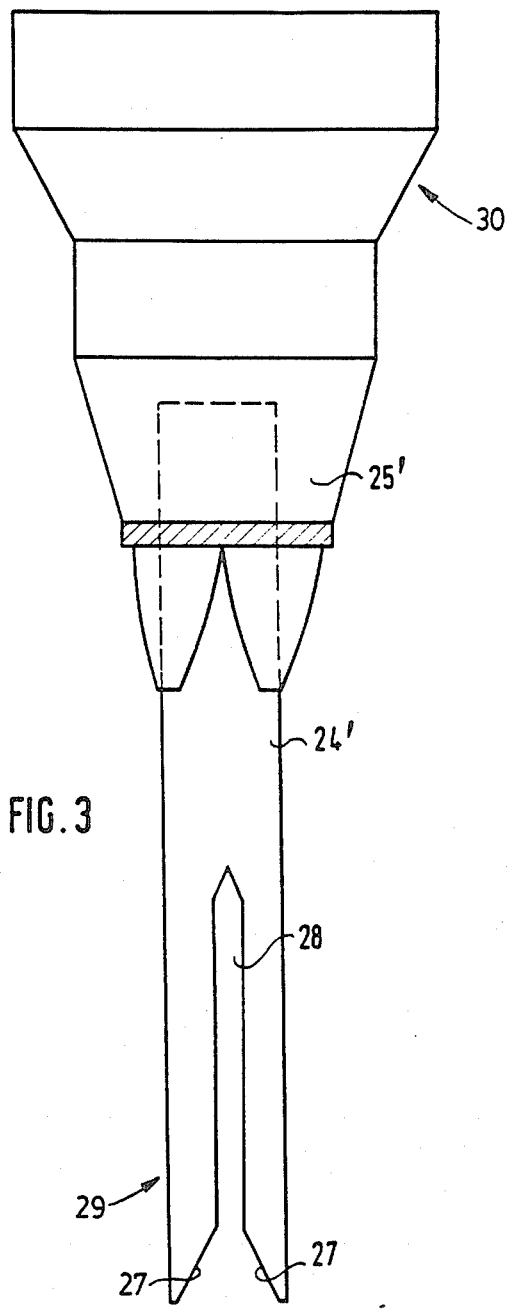
FIG. 3 shows a side view of a key for the mounting element according to FIG. 2 in a drill chuck of a drilling machine.

The wall of the duct of an air-conditioning system, shown in FIG. 1, forms a thin-walled base 1 of steel sheet which is galvanized on both sides 2,3. A fibreglass mat 4 with an aluminium foil lining 6 is used as insulation. This flat insulating body 4,6 is attached at several points to the thin-walled base 1 by means of mounting elements. One of these attachment points is shown in FIG. 1.

The mounting element consists of a steel pin 8 and a screw consisting of a head 12 adn a shaft 9. The steel pin 8 and the screw 9,12 form one constructional unit.

The free end of the shaft 9 has a drill tip 10 having cutting edges 11. The shaft 9 is provided with a self-cutting thread 14 which reaches to a collar 15 formed by the underside of the screw head 12. The collar 15 is used for clamping a sealing disc 16 which seals on a circular area 17 of the inside 3 of the base 1 which surrounds a drilled hole 18 into which a thread 19 is cut by means of the self-cutting thread 14.

The collar 15 forms the larger end is diameter of the conically constructed head 12 of the screw. The conical head 12 is provided with four key engaging faces 22 which are in each case offset 90°. It thus has the shape of a four-sided truncated pyramid. The key engaging faces 22 are used for tranferring the torques to the drill tip 10 and to the shaft 9 with the self-cutting thread 14.

The conical screw head 22 changes into the cylindrical steel pin 8 the tip 7 of which is constructed to be pyramid-shaped. The cylindrica; section immediately following this tip 7 is provided with a roughening 23. The works in conjunction with a round elastic clamping plate 24 which is provided with four notches 25, which are mutually offset by 90°, and at the point of intersection with a recess 26 for the pin 8.

To be able to apply the mounting element to a base by means of a drilling machine, a key, constructed as spring 29, is provided which can be inserted with one end into the drill chuck 30, only partially shown, of an electric hand drilling machine. At its free end the key has inner counter-faces 27 which match the outer key engaging faces 22 and which form a conical recess. From this recess, a recess 28 axially extends which completely accommodates the steel pin 8 when the key 29 is placed on the head 12 of the screw.

The insulating body 4 is attached to the base 1 as follows:

Initially, the mounting elements are attached to the base 1. For this purpose, the entire constructional unit is pushed with its pin 8 into the recess 28 of the key 29 until the key engaging faces 22 and the couterfaces 27 positively rest against each other. Using the drill tip 10, a hole is drilled at the selected place of the base 1 as is usual with metal drills and subsequently the thread 19 is cut with the self-cutting thread 14. The cutting-in and screwing down is continued until the sealing disc 16 comes to rest against the outside 3 of the base 1 due to the collar 15 and is clamped in.

As can be seen from FIG. 1, the shaft 9 protects inward to a certain extent but it is otherwise joined positively to the base 1 via the self-cutting thread 14 and the thread 19 cut in. The constructional units thus firmly seated. The insulating body 4 is then pushed on over the pin 8, during which process the tip 7 first penetrates the fibreglass mat 5 with the foil lining 6. The length of the pin 8 has been selected in such a manner that a least a part-section of the roughening 23 projects outwards past the lining 6. Following this, the elastic clamping plate 24 is pushed on which is firmly fixed at the roughening 23 by deforming the tabs formed by cutouts.

We claim:

1. In a mounting element for mounting a flat insulating material on a thin-walled base, said mounting element including a pin conformed at one end for perforating the insulating material and having means connected to the other endof the pin for attaching to the base and a clamping plate for clamping to the pin, to hold the insulating material on the pin, the improvement wherein the attaching means comprises a screw having a shaft and a head fixedly connected to the shaft and the other end of the pin, with the pin and shaft in axial alignment, wherein the shaft has a self-cutting thread and a drill tip and wherein the head has key engaging faces for driving by a drill.

2. The mounting element according to claim 1, further comprising a sealing disc seated on the shaft of the screw under the head.

3. The mounting element according to claim 1 or 2, wherein the head of the screw tapers conically towards the other end of the pin.

4. The mounting element according to claim 3, wherein the head of the screw comprises a four-sided truncated pyramid having surface areas forming the key engaging faces.

* * * * *